United States Patent [19]
Akiyama et al.

[11] Patent Number: 5,272,533
[45] Date of Patent: Dec. 21, 1993

[54] IMAGE CONTROL APPARATUS FOR A TELEVISION RECEIVER

[75] Inventors: Moriyoshi Akiyama, Fujisawa; Toshiyuki Kurita; Hiroshi Sekiya, both of Yokohama; Sunao Suzuki, Fujisawa; Katsumi Hishiyama, Kamakura; Toshinori Murata, Yokohama, all of Japan

[73] Assignees: Hitachi, Ltd., Tokyo; Hitachi Video & Information System, Inc., Kanagawa, both of Japan

[21] Appl. No.: 820,222

[22] Filed: Jan. 14, 1992

[30] Foreign Application Priority Data

Jan. 14, 1991 [JP] Japan ................. 3-002518

[51] Int. Cl.⁵ ............... H04N 5/21; H04N 5/108
[52] U.S. Cl. ..................... 358/167; 358/166; 358/36; 358/37; 358/905
[58] Field of Search ............ 358/167, 166, 160, 36, 358/37, 905

[56] References Cited

U.S. PATENT DOCUMENTS

| | | | |
|---|---|---|---|
| 4,424,533 | 1/1984 | Rzesewski | 358/167 |
| 4,502,077 | 2/1985 | Morotomi et al. | 358/167 |
| 4,916,542 | 4/1990 | Yoneda et al. | 358/167 |
| 5,136,386 | 8/1992 | Okada et al. | 358/167 |

FOREIGN PATENT DOCUMENTS

| | | |
|---|---|---|
| 0328346 | 8/1989 | European Pat. Off. |
| 68117780 | 7/1983 | Japan |
| 6243272 | 2/1987 | Japan |
| 146076 | 6/1987 | Japan |
| 2146871 | 6/1990 | Japan |
| 3132165 | 6/1991 | Japan |

Primary Examiner—James J. Groody
Assistant Examiner—Glenton B. Burgess
Attorney, Agent, or Firm—Antonelli, Terry, Stout & Kraus

[57] ABSTRACT

An image control apparatus includes a waveform equalizer, a distorted waveform extraction control unit, a noise reduction circuit, and an image quality control unit. The waveform equalizer receives an input video signal, equalizes the waveform of the video signal, and outputs the waveform equalized video signal. The distorted waveform extraction control unit detects a distorted waveform from the output of the waveform equalizer and controls the waveform equalizer to perform waveform equalization suitable for the input video signal. It also controls the noise reduction circuit and the image quality control unit in accordance with changes in the frequency characteristic of the video signal before and after waveform equalization to intensify the noise reduction for degrading the image quality, when the high frequency band of the frequency characteristic of the input signal has been lowered, and, conversely, to debilitate or stop the noise reduction for enhancing the image quality, when the high frequency band has been raised.

34 Claims, 12 Drawing Sheets

IMAGE CONTROL APPARATUS FOR A TELEVISION RECEIVER

BACKGROUND OF THE INVENTION

The present invention relates to an image control apparatus for a television receiver, and more particularly to an image control apparatus of this kind which is adapted to remove distorted waveforms, such as ghosts, and noises to improve the image quality.

One of problems inherent to television signals emitted from a broadcasting station is the distorted waveform, such as a ghost. A technique for removing such distorted waveform is disclosed, for example, in JP-1-59791.

FIG. 1 is a block diagram illustrating an example of a prior art image control apparatus for a television receiver. In FIG. 1, reference numeral 101 designates a waveform equalizing means, 201 a storage means, 202 a distorted waveform detecting unit, 203 a processing unit, 204 a waveform equalizing means control unit, 210 a noise detecting unit, and 104 an image quality control unit.

The waveform equalizing means 101 removes distorted waveform from a video signal fed from a video signal detecting circuit. The storage means 201 synchronously adds the video signal to reduce noises included therein, as well as stores the video signal thus noise reduced. The distorted waveform detecting unit 202 exclusively extracts a GCR signal (Ghost Cancel Reference Signal: refer to Official Gazette No. 155, Aug. 1, 1989, Order of Post Service Ministry No. 48 for detail) or a reference signal such as a synchronizing signal from an input or output signal of the waveform equalizing means 101, and compares this reference signal with a base signal stored in the distorted waveform detecting unit 202 to detect distorted waveform from the difference therebetween. Further, the processing unit 203 generates data corresponding to each frequency for controlling the waveform equalizing means 101 from an output from the distorted waveform detecting unit 202 such that the waveform equalizing means 101 has the characteristic for removing the detected distortion in waveform. Thus, the waveform equalizing means control unit 204 controls the waveform equalizing means 101 in accordance with the output of the processing unit 203 to perform suitable waveform equalization. The noise detecting unit 210 examines the magnitude of noise from data stored in the storage means 201. If the magnitude is above a predetermined value, the noise detecting unit 210 controls the image quality control unit 104 to degrade the image quality so as to make the noise invisible.

The above-mentioned prior art utilizes a waveform equalizing means for removing distorted waveform so as to make the characteristic of a video signal uniform from a low frequency band to a high frequency band, and only when the signal-to-noise (S/N) ratio presents a low value, the image quality is automatically degraded to provide an acceptably clear image. Stated another way, with a low S/N ratio, an acceptable image may be provided by degrading the image quality even if the waveform equalization is not perfectly performed. Therefore, it can be said that this method is intended to merely compensate for imperfect waveform equalization.

In the above-mentioned prior art, even if the S/N ratio of an input signal is not so low, when the input signal has few components in the high frequency band, performing waveform equalization for this signal may result in amplifying not only the high frequency components but also noises, thereby causing a coarse image. However, the image quality control unit cannot produce any effect on such a degraded image.

Further, as a general problem of this kind of waveform equalizing means, when a signal is input for intentionally producing a coarse-effect image, wherein a high frequency band of the frequency characteristic of the signal is excessively raised, the input signal is equalized, in the prior art, to lower the high frequency band thereof to make the overall frequency characteristic flat, which, however, may result in an excessively soft image quality from the viewpoint of visual sense, compared with the image before equalization, thereby giving an impression of a dim image, in comparison with the image produced by the input signal without being equalized.

SUMMARY OF THE INVENTION

It is an object of the present invention to provide for optimal image quality, wherein after the frequency characteristic of an input video signal has been examined, when the high frequency band has been raised over a predetermined level, a high frequency band of the frequency characteristic of the input video signal is raised to upgrade the image quality (enhance the sharpness) after performing waveform equalization so as to remove an impression of dim image given to the visual sense, or when the high frequency band of the frequency characteristic of the input video signal is below the predetermined level, noise reduction is performed after waveform equalization or the high frequency band of the frequency characteristic is lowered to further degrade the image quality (degrade the sharpness) to suppress deterioration of the S/N ratio.

To achieve the above object, the present invention provides an image control apparatus comprising waveform equalizing means for processing and outputting an input video signal, distorted waveform extraction control means for detecting distorted waveforms from the output signal of the waveform equalizing means to control the waveform equalizing means, means for performing noise reduction on the video signal having passed the waveform equalizing means by means of the output of the distorted waveform extraction control means, and means for controlling the image quality of the video signal output from the noise reducing means.

The waveform equalizing means flattens and outputs the frequency characteristic of an input signal. The distorted waveform extraction control means detects whether the output of the waveform equalizing means includes a distorted waveform, and controls the waveform equalizing means to remove the distorted waveform if present. Simultaneously, the distorted waveform extraction control means detects changes in the frequency characteristic caused by removing the distorted waveform. The noise reducing means performs noise reduction on a video signal output from the waveform equalizing means by means of the output of the distorted waveform extraction control means. The image quality control means controls the image quality (sharpness) by means of the output of the distorted waveform extraction control means. The processing as described above can prevent deterioration of the S/N ratio and a dim image impression which may be possibly caused by largely compensating the frequency characteristic before and after performing the waveform equalization.

DESCRIPTION OF THE PREFERRED EMBODIMENTS

Figure 2:
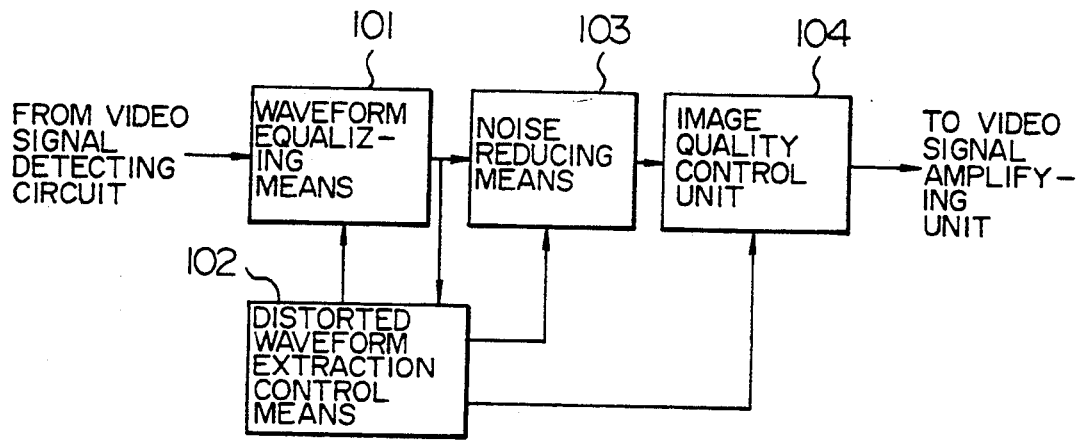
FIG. 2 is a block diagram illustrating an embodiment of the present invention.

FIG. 2 illustrates a first embodiment Of the present invention. An image control apparatus of this embodiment comprises a waveform equalizing means 101 which receives an input video signal, removes distorted a waveform such as ghost therefrom, and outputs a distortion-free video signal: a distorted waveform extraction control means 102 Coupled to receive the output of the waveform equalizing means 101 for detecting a distorted waveform such as ghost and for controlling the waveform equalizing means 101, a noise reducing means 103; and an image quality control unit 104. The noise reducing means 103 is coupled to receive the output from the waveform equalizing means 101 for reducing noise in the input video signal by means of the output of the distorted waveform extraction control means 102 and for outputting a noise-reduced video signal, and the image quality control unit 104 is coupled to receive the video signal output from the noise reducing means 103 for adjusting the image quality (particularly the sharpness) of the video signal by means of the output of the distorted waveform extraction control means 102 and for outputting the video signal having the image quality thereof thus adjusted.

Figure 3:
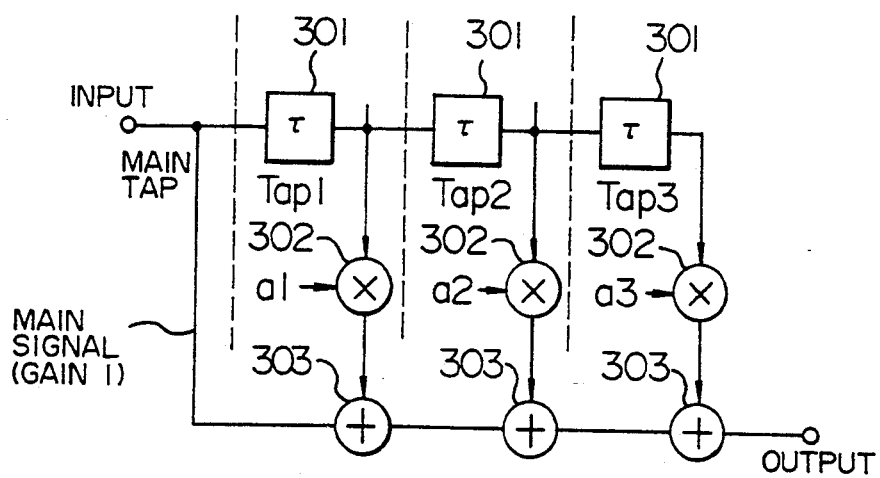
FIG. 3 is a block diagram illustrating in detail a waveform equalizing means appearing in FIG. 2.

FIG. 3 is a block diagram illustrating an example of the waveform equalizing means 101 shown in FIG. 2. In general, waveform equalizing means may be implemented by a transversal filter which has a gain corresponding to each frequency for making the frequency characteristic flat. In FIG. 3, reference numeral 301 designates a delay unit, 302 a multiplying unit, and 303 an adding unit. Reference letter T represents a delay time provided by the delay unit 301, and a set of the delay unit 301 and the multiplying unit 302 form a tap. Each adding unit 303 adds the output of a corresponding tap to the output of the adding unit 303 at the previous stage and supplies the sum of the two to the adding unit 303 at the next stage. In the transversal filter shown in FIG. 3, a tap is formed of one each of the delay unit 301 and the multiplying unit 302, and the adding unit 303 adds the output of a corresponding multiplying unit 302 to the output of the adding unit at the previous stage and outputs the resultant value. FIG. 3 shows a waveform equalizing means having three taps. Reference letter $\tau$ designates a delay time provided by each of the delay units 301, and a1, a2 and a3 tap gains multiplied with input signals to the respective multiplying units 302. The transversal filter divides an input signal into a main signal with a unity gain passing through a main tap and another signal delayed by a time kt (k is an integer number) from the main signal, controls the gain of the delayed signal, and adds the gain controlled signal with the main signal, thereby realizing a filter having a variety of filter characteristics. If a signal delayed by a time $\tau$ from the main signal is added to the main signal, frequency components at $1/\tau$ included in the two signals become in phase with each other, and accordingly the amplitude thereof becomes wider. On the contrary, frequency components at $1/2\tau$ included in the two signals become in opposite phase, whereby the amplitude thereof becomes narrower. It is understood from the above facts that the outputs of respective delay units constituting the transversal filter emphasize or attenuate particular frequency components of a delayed signal proportional to the reciprocal of a delay time from the main signal in accordance with the gains of the respective taps.

Figure 4A:
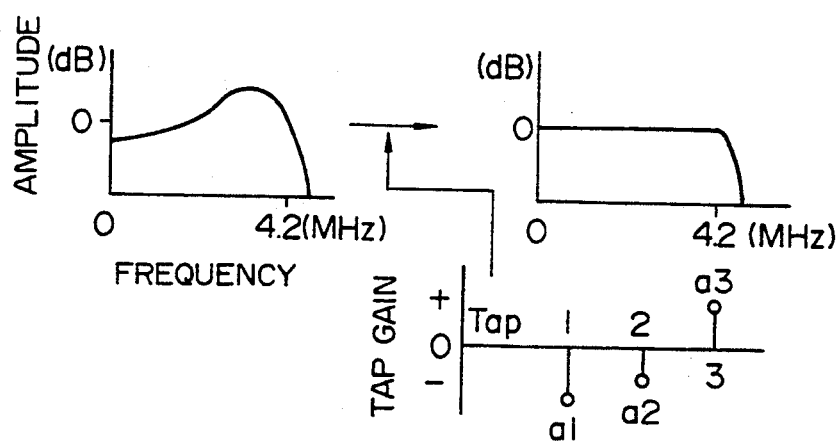
FIGS. 4A–4C are graphs showing the frequency characteristics of inputted video signals used for explaining the operation of the circuit shown in FIG. 3.
Figure 4B:
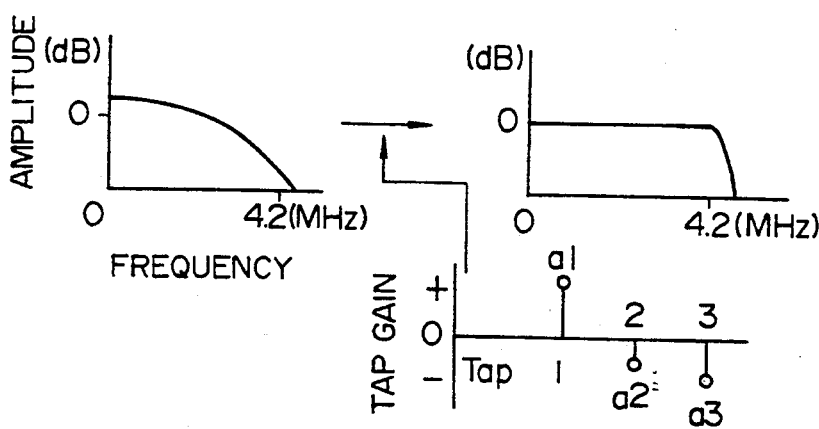
Figure 4C:
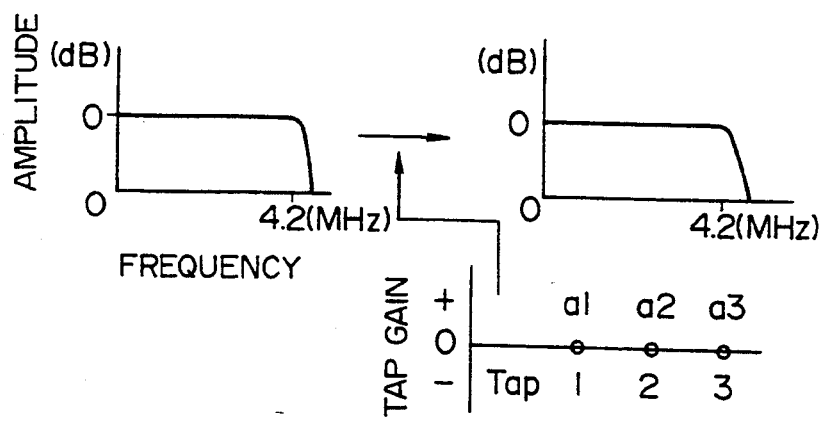

FIGS. 4A–4C simply show the gains of the respective taps for the characteristics of three kinds of input signals. FIG. 4A shows a case where a high frequency band of the input signal is raised, where the gain a1 of a Tap1 ($1/\tau$) corresponding to the high frequency band on the frequency axis is reduced, while the gain a3 of a Tap3 ($1/3\tau$) corresponding to a low frequency band is enhanced. FIG. 4B shows a case where a high frequency band is dropped, where the gain a1 is increased for raising the high frequency band. Finally, FIG. 4C shows a case where the frequency characteristic of an input signal is flat, where the input signal may be output as it is, so that the gains of the respective taps are set to zero. Thus, a compensation amount for the frequency characteristic can be seen from the tap gains after compensation.

Thus, the frequency characteristic of the waveform equalizing means 101 can be controlled by controlling the tap gains a1, a2 and a3 respectively applied to the multiplying units 302, thereby enabling, as the result, waveform equalization suitable to an input video signal. In this event, the tap gains a1, a2 and a3 are output from the distorted waveform extraction and control means 102.

Figure 5:
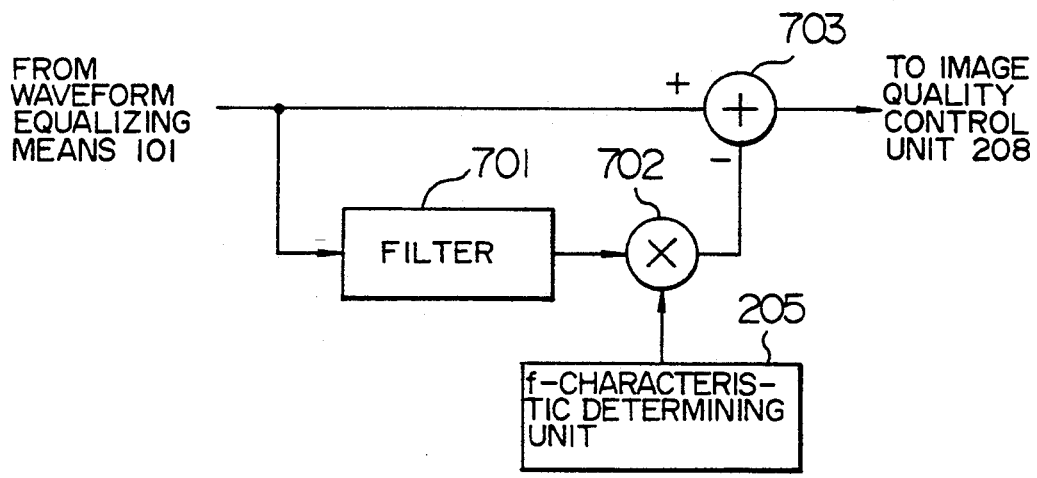
FIGS. 5 and 6 are block diagrams respectively illustrating different embodiments of a noise reducing means shown in FIG. 2.

Next, FIG. 5 illustrates a specific configuration of the noise reducing means 103 shown in FIG. 2. In FIG. 5, reference numeral 701 designates a filter for extracting noise components, 702 a multiplying unit, 703 an adding unit, and 205 a frequency characteristic determining unit (hereinafter simply called the f-characteristic determining unit) which is built in the distorted waveform extraction control means 102 for outputting a noise reduction control signal, the details of which will be later described. The output of the waveform equalizing means 101 is input to the filter 701 which exclusively outputs a frequency band of, for example, 2-3 MHz, including noise components which may be visible in images. The multiplying unit 702 multiplies the output of the filter 701 with the output of the f-characteristic determining unit 205 to amplify the former to an appropriate magnitude. The adding unit 703 subtracts the output of the f-characteristic determining unit 205 from the output of the waveform equalizing means 101, thereby making it possible to remove noises.

Figure 6:
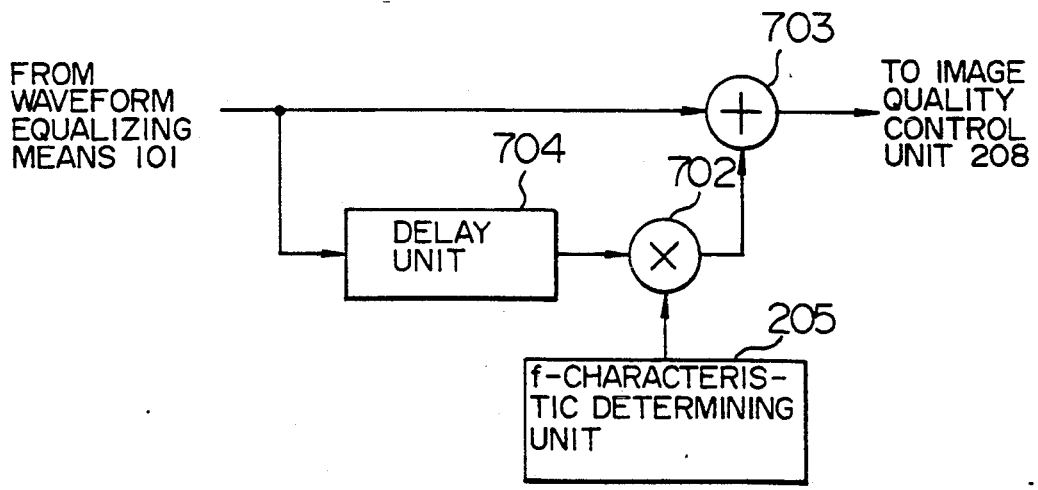

FIG. 6 illustrates a second specific example of the noise reducing means 103 shown in FIG. 2. In FIG. 6, reference numeral 704 designates a delay unit, 702 a multiplying unit, 703 an adding unit, and 205 an f-characteristic determining unit. The delay unit 704 receives a video signal output from the waveform equalizing means 101 and outputs the same with a delay of a two-frame portion. The multiplying unit 702 multiplies the output of the delay unit 704 with the output of the f-characteristic determining unit 205 to attenuate the output of the delay unit 704 to an appropriate magnitude. The adding unit 703 adds the output of the multiplying unit 702 to the output of the waveform equalizing means 101. In still images, in general, a current signal hardly changes from a signal two frame before, however, noises do not have correlation between frames, so that noise components become relatively smaller if the signal two frame before is added to the current signal. It will be appreciated from this fact that noises can be reduced by this specific example of the noise reducing means.

Figure 7:
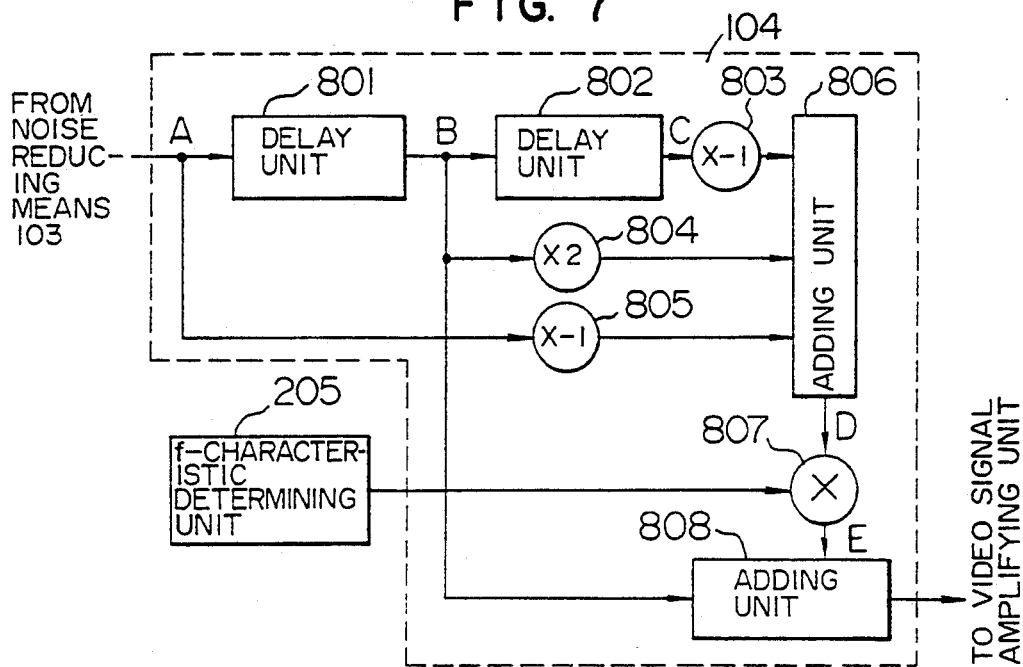
FIG. 7 is a block diagram illustrating in detail an image quality control unit shown in FIG. 2.

FIG. 7 illustrates a specific example of the image quality control unit 104 shown in FIG. 2. In FIG. 7, reference numerals 801 and 802 designate delay units; 803, 804, 805 and 807 multiplying units; and 806 and 808 adding units. An output A of the noise reducing means 103 is delayed by the delay unit 801 to derive an output B which is in turn delayed by the delay unit 802 to derive an output C. Then, the output C of the delay unit 802, the output B of the delay unit 801 and the output A of the noise reducing means 103 are summed by the adding unit 806 through the multiplying units 803, 804 and 805, respectively, to extract particular frequency components, thereby obtaining an output D. Then, the output D of the adding unit 806 is amplified or attenuated by an image quality control signal generated from the f-characteristic determining unit 205 to derive an output E which is added to the output B of the delay unit 801 by the adding unit 808, whereby particular frequency components are emphasized or attenuated to adjust the image quality.

Figure 1:
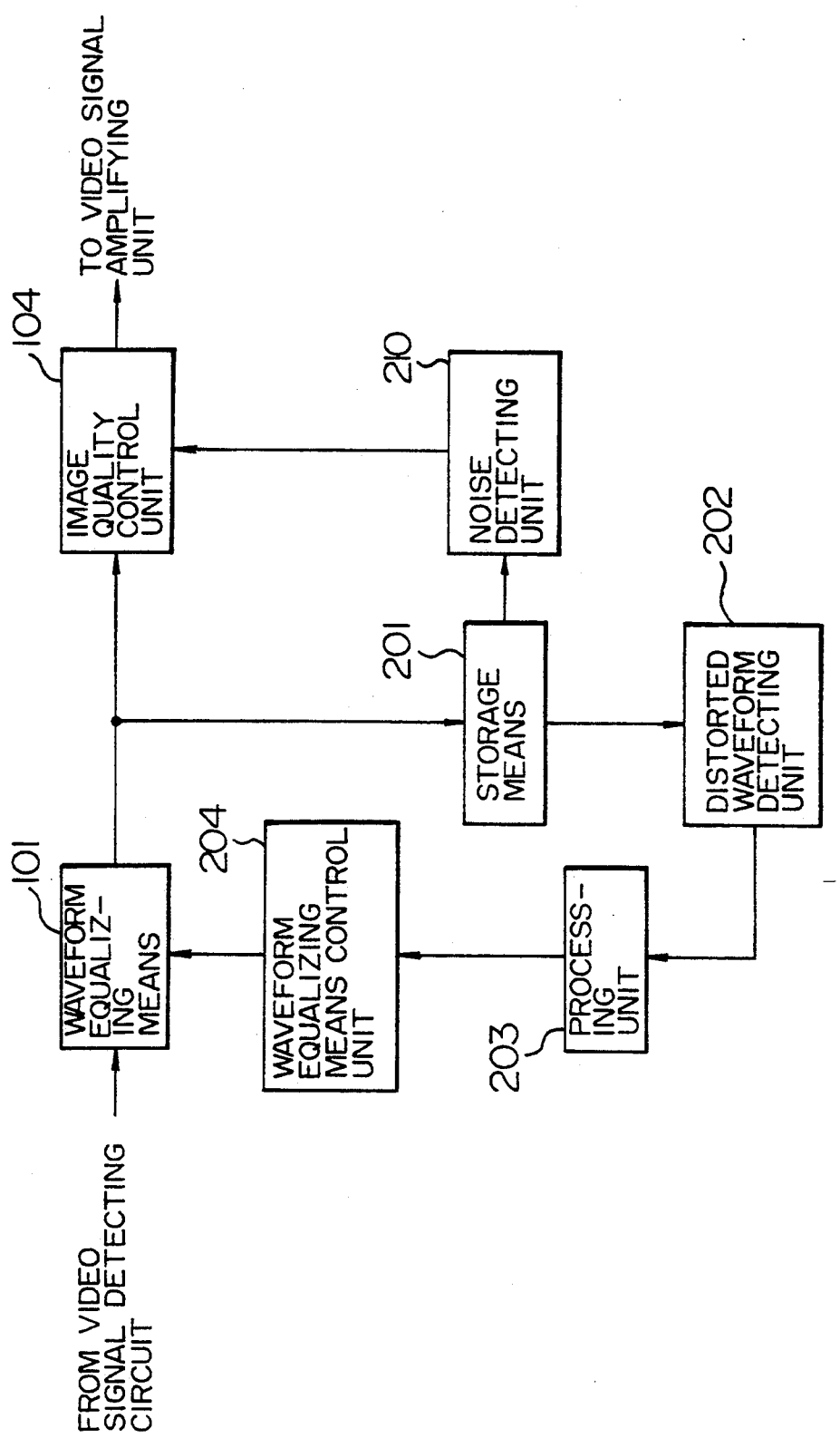
FIG. 1 is a block diagram illustrating a prior art apparatus close to the present invention.
Figure 8:
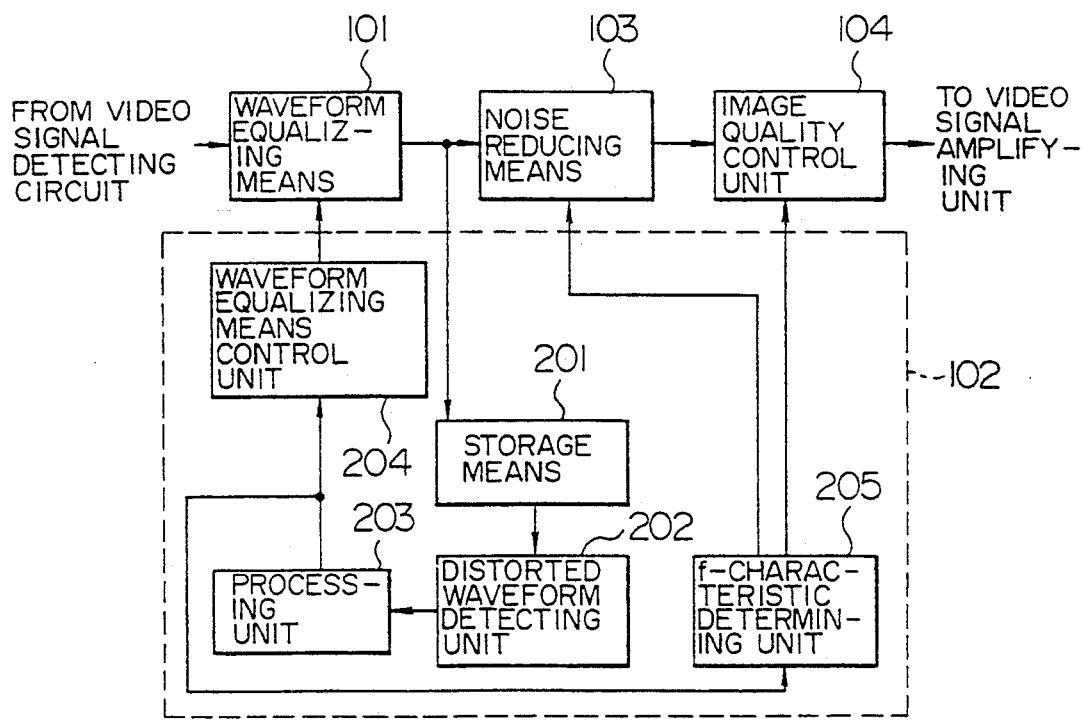
FIG. 8 is a block diagram illustrating in detail a distorted waveform extraction control means shown in FIG. 2.

FIG. 8 is a block diagram illustrating in greater detail the configuration of the distorted waveform extraction control means shown in FIG. 2. In FIG. 8, components identical to those in FIG. 1 or FIG. 2 are designated the same reference numerals. Reference numeral 205 designates a f-characteristic determining unit. The waveform equalizing means 101 is implemented by a transversal filter. The output from the waveform equalizing means 101 is synchronously added to a video signal based on a reference signal such as a GCR signal or a synchronizing signal, and temporarily stored in a storage means 201 for reducing noises in the video signal. Next, a distorted waveform detecting unit 202 compares the output from the storage means 201 with a base waveform previously provided therein to detect distorted waveform. More specifically, the distorted waveform detecting unit 202 synchronizes a peak point of the base waveform with a peak point of the reference signal included in the video signal from the storage unit 201, and obtains the difference between the two waveforms to thereby detect a distorted waveform. Then, a processing unit 203 calculates, by means of the output of the distorted waveform detecting unit 202, a delay time from a peak time of the base signal to a peak time deviated due to distortion in the video signal and the magnitude of the distortion. The processing unit 203 then calculates, based on the delay time thus derived, and outputs addresses representing tap numbers shown in FIG. 3 and tap gains a1, a2 and a3 of the respective addresses. The tap gain is calculated by an equation according to the following ZF method:

$$C_i(k) = C_i(k-1) - \alpha e_i(k)$$

where
 $C_i(k)$: a gain of the $i^{th}$ tap at the $k^{th}$ time;
 $\alpha$: a feedback coefficient; and
 $e_i(k)$: a difference between the reference signal and the base signal corresponding to the $i^{th}$ tap calculated at the $k^{th}$ time.

A waveform equalizing means control unit 204 supplies the calculation results given by the processing unit 203 to the waveform equalizing means 101 to control the same so as to have the characteristic for performing suitable waveform equalization for a given video signal.

The f-characteristic determining unit 205 determines, from the addresses and the tap gains supplied from the processing unit 203 to the waveform equalizing means control unit 204, how the frequency characteristic has been changed by the waveform equalizing means 101. If a high frequency band has been lowered, the f-characteristic determining unit 205 controls the noise reducing means 103 to cancel noise reduction or debilitate the noise reduction effect, and controls the image quality control unit 104 to raise the high frequency band by an amount of reduced high frequency band caused by the noise reduction so as to enhance the image quality. On the contrary, if the high frequency band has been raised, the f-characteristic determining unit 205 controls the noise reducing means 103 to perform noise reduction or enhance the noise reduction effect and simultaneously controls the image quality control unit 104 to lower the high frequency band so as to degrade the image quality.

Figure 9:
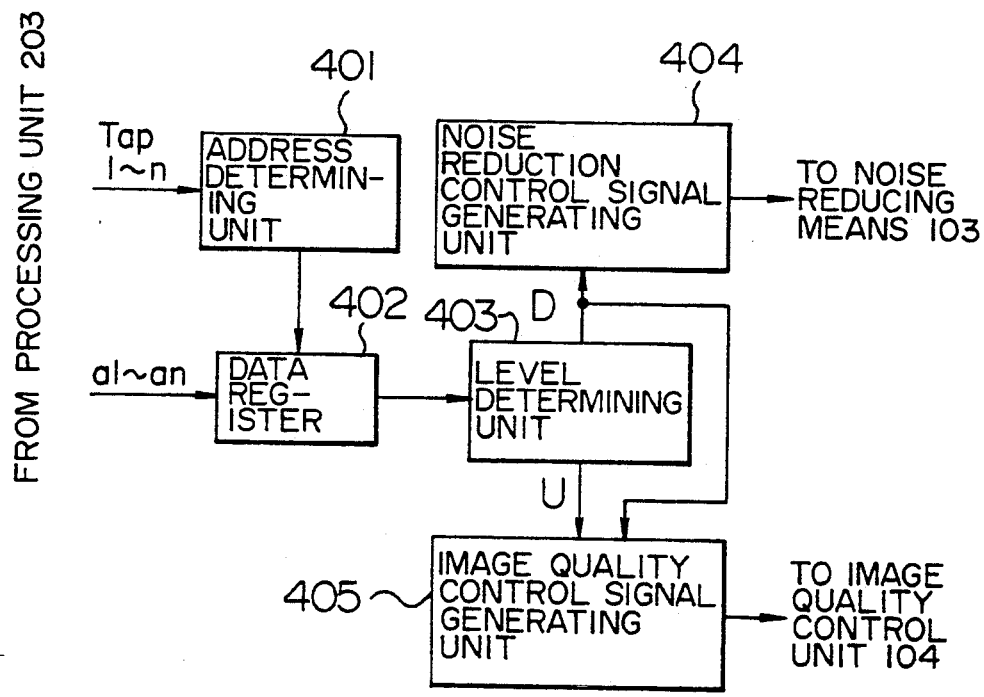
FIG. 9 is a block diagram illustrating in detail a frequency characteristic determining unit shown in FIG. 8.

FIG. 9 illustrates a first embodiment of the f-characteristic determining unit 205 shown in FIG. 8. In FIG. 9, reference numeral 401 designates an address determining unit, 402 a data register, 403 a level determining unit, 404 a noise reduction control signal generating unit, and 405 an image quality control signal generating unit.

The numbers of the respective taps constituting the transversal filter (Tap 1−n). are sequentially supplied from the processing unit 203 to the address determining unit 401, while the gains (al−an) of the respective taps at that time are simultaneously input to the data register 402. The address determining unit 401 has stored the address of a tap number corresponding to a frequency band from 2 to 3 MHz where noises are particularly visible. If the address of this particular tap is input to the f-characteristic determining unit 205, the address determining unit 401 has the data register 402 hold the tap gain corresponding to that address.

The level determining unit 403 determines whether a tap gain held in the data register 402 is positive, negative or zero. If positive, it generates a high level output at a D-output terminal and a low level output at a U-output terminal. If negative, a low level output is generated at the D-output terminal while a high level output is generated at the U-output terminal. If the tap gain is substantially zero, low level outputs are generated at both of the D- and U-outputs.

The noise reduction control signal generating unit 404 generates a signal for controlling the noise reducing means 103 from the output of the level determining unit 403. Also, the image quality control signal generating unit 405 generates a signal for controlling the image quality control unit 104 from the output of the level determining unit 403.

Figure 10:
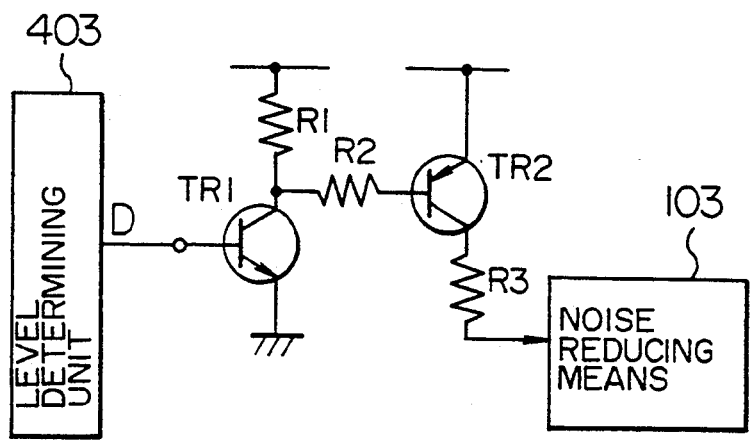
FIG. 10 is a circuit diagram illustrating in detail a noise reduction control signal generating unit shown in FIG. 9.

FIG. 10 illustrates an embodiment of the noise reduction control signal generating unit 404 shown in FIG. 9. In FIG. 10, references TR1 and TR2 designate transistors, and R1, R2 and R3 resistors. When the input of the transistor TR1 becomes high level by a high level output from the level determining unit 403, the transistor TR1 is turned on, and the transistor TR2 is also turned on, which results in increasing the output voltage of the transistor TR2 supplied to the noise reducing means 103. It will be appreciated from the above description that this embodiment permits noise reduction to be performed or not in accordance with the characteristic of an input signal.

Figure 11:
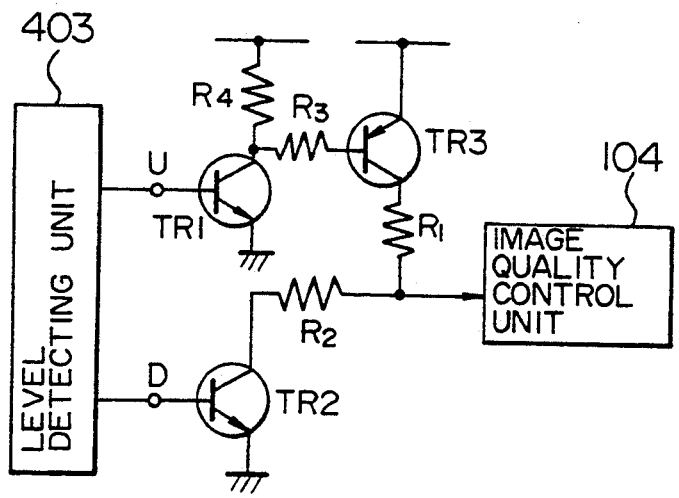
FIG. 11 is a circuit diagram illustrating in detail an image quality control signal generating unit shown in FIG. 9.

FIG. 11 illustrates an embodiment of the image quality control signal generating unit 405 shown in FIG. 9. In FIG. 11, references TR1, TR2 and TR3 designate transistors, and R1, R2, R3 and R4 resistors. When a terminal U for enhancing the image quality is at high level, the transistor TR1 is turned on, causing the transistor TR3 to also be turned on, which results, in increasing the output voltage of the transistor TR3 which is supplied to the image quality control unit 104. On the other hand, when a terminal D for degrading the image quality is at high level, the transistor TR2 is turned on, thereby decreasing a voltage coupled to the image quality control unit 103. Further, when the terminals U and D are both at low level, no control signal is supplied to the image quality control unit 103, so that the image quality remains unchanged. Naturally, both of the terminals U and D will never become high level simultaneously. It will be thus appreciated that this embodiment can control the image quality at three levels, i.e., enhancing, degrading or maintaining the image quality, in accordance with the characteristic of an input signal.

Figure 12:
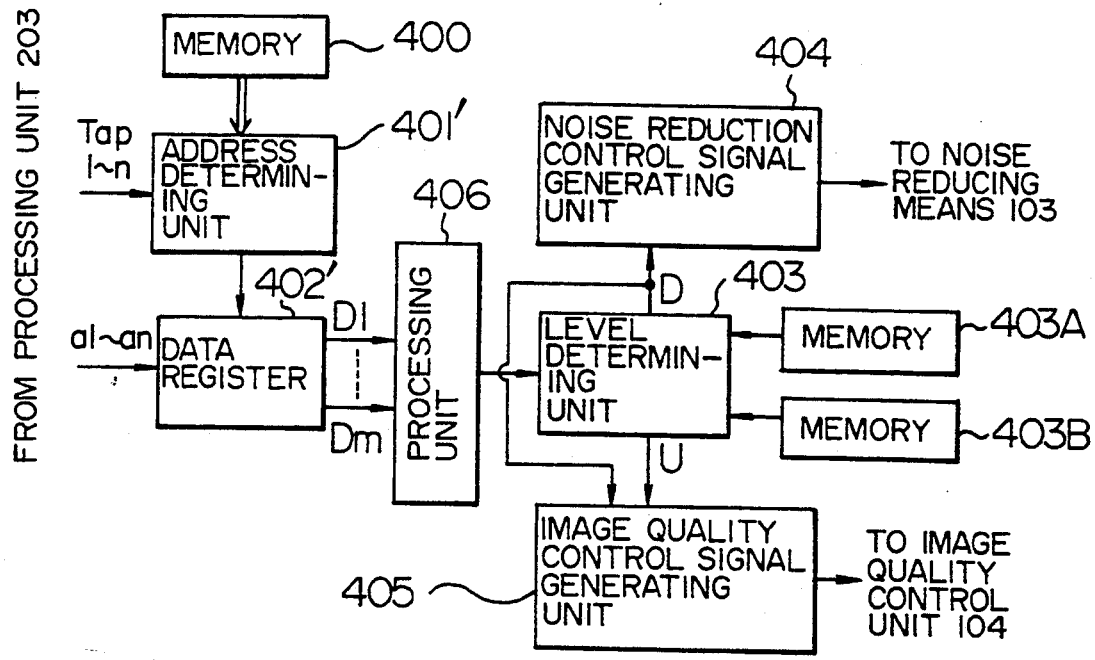
FIGS. 12–14 are block diagrams respectively illustrating other different embodiments of the frequency characteristic determining unit shown in FIG. 8.

FIG. 12 illustrates a second embodiment of the f-characteristic determining unit 205 shown in FIG. 8. In FIG. 12, reference numeral 401' designates an address determining unit, 402' a data register, and 406 a processing unit. This embodiment utilizes a plurality of tap gains. More specifically, the output of the processing unit 203 is supplied to the address determining unit 401' and the data register 402', in a manner similar to the embodiment shown in FIG. 9. A memory 400 has previously stored addresses of either a plurality of preselected taps or all of the taps. The address determining unit 401' compares respective tap numbers supplied from the processing unit 203 with the addresses previously stored in the memory 400. When tap numbers coincident with the addresses are input, the address determining unit 401' has the data register 402' hold data at that time. Outputs (Dl−Dm: m≦n) from the data register 402' are summed by the processing unit 406. The summed value output from the processing unit 406 is used by the level determining unit 403 to determine whether or not noise reduction is performed, and whether the image quality is enhanced, degraded or maintained. The level determining unit 403 is connected to a memory 403A for storing a predetermined positive base level and a memory 403B for storing a predetermined negative base level. When an input from the processing unit 406 is larger than the positive base level stored in the memory 403A, the level determining unit 403 generates a high level output at a terminal D. On the other hand, when an input is smaller than the negative base level stored in the memory 403B, it generates a high level output at a terminal U. Similarly to the embodiment shown in FIG. 9, the noise reduction control signal generating unit 404 generates a signal for controlling the noise reducing means, while the image quality control signal generating unit 405 generates a signal for controlling the image quality control unit 103. Incidentally, more appropriate characteristics can be provided by giving weights to inputs Dl−Dm supplied to the processing unit 406.

Figure 13:
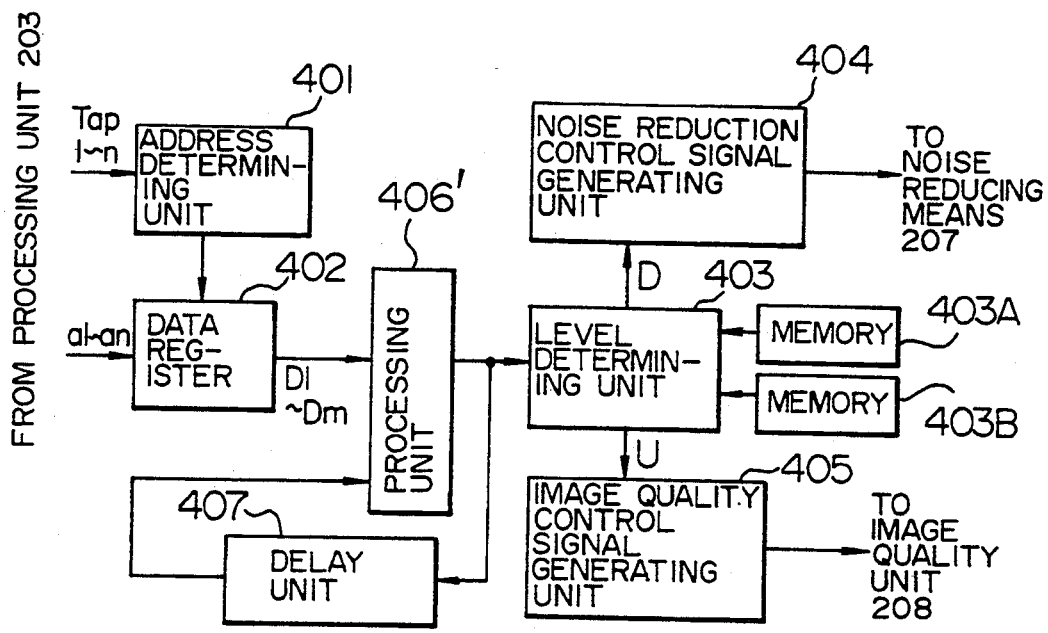

FIG. 13 illustrates a third embodiment of the f-characteristic determining unit 205 shown in FIG. 8. In FIG. 13, reference numeral 406' designates a processing unit, and 407 a delay unit. This embodiment also utilizes a plurality of taps. Therefore, this embodiment differs from the f-characteristic determining unit 205 shown in FIG. 12 only in the processing unit 406'. Specifically, the processing unit 406' of FIG. 13 is arranged to add data one by one by means of the delay unit 407, not simultaneously process all data, so that a data register 402 requires only one output and the processing unit 406' need not have multiple inputs, whereby the size of the whole f-characteristic determining unit 205 can be reduced.

Figure 14:
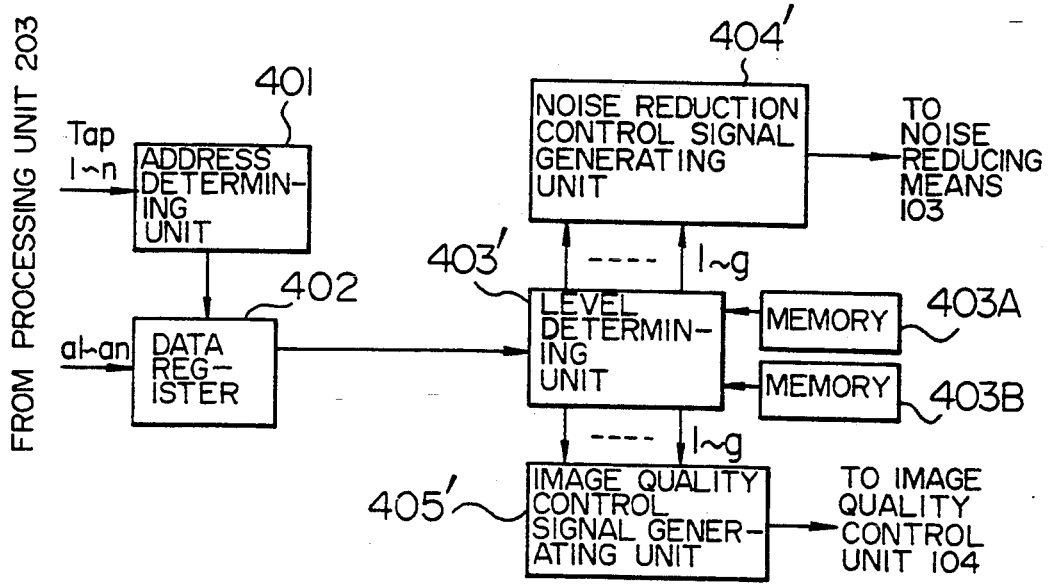

FIG. 14 illustrates a fourth embodiment of the f-characteristic determining unit 205 shown in FIG. 8. In FIG. 14, reference numeral 403 designates a level determining unit, 404' a noise reduction control signal generating unit, and 405' an image quality control signal generating unit. This embodiment performs a multi-value control. More specifically, the output of a data register 402 is compared with base levels stored in the memories 403A and 403B by the level determining unit 403' which generates a signal corresponding to the difference therebetween (1−g in the positive direction and 1−g in the negative direction) represented in digital manner, such that the noise reduction control signal generating unit 404' generates a signal for controlling the noise reducing means 103 in multiple steps, while the image quality control signal generating unit 404' generates a signal for controlling the image quality control unit 104 in multiple steps. A sequential control can also be performed on the degrees of noise reduction and the image quality by converting the control signals to sequential amounts. Such multiple-step control can also be performed for the case where a plurality of tap data are utilized as shown in FIGS. 12 and 13.

Figure 15:
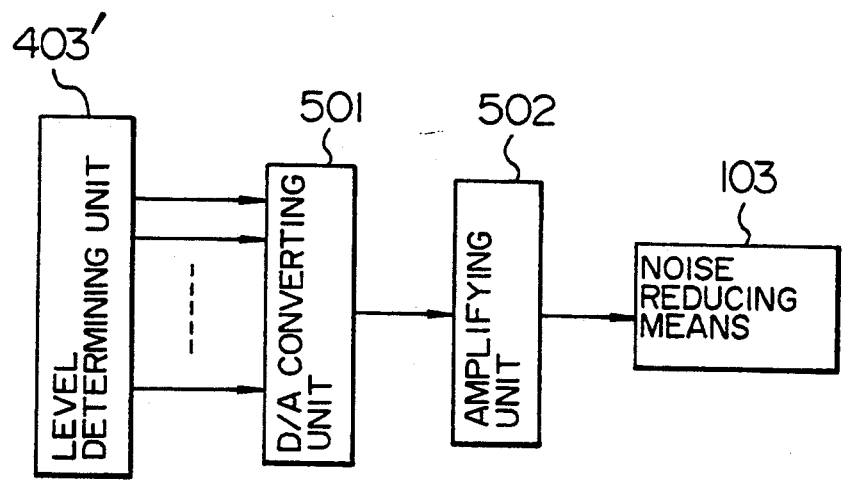
FIG. 15 is a block diagram illustrating an example of a noise reduction control signal generating unit shown in FIG. 14.

FIG. 15 illustrates a specific example of the noise reduction control signal generating unit 404' shown in FIG. 14. In FIG. 15, reference numeral 501 designates a digital-to-analog (D/A) convertor, and 502 an amplifier. The D/A convertor 501 receives outputs of the level determining unit 403' to generate a sequential signal corresponding to the received outputs. The amplifier 502 amplifies the output signal of the D/A convertor 501 so as to provide a necessary magnitude, and supplies the amplified signal to the noise reducing means 103. It will thus be appreciated that the illustrative noise reduction control signal generating unit 404 constructed as described above can sequentially control the degree of noise reduction to be performed.

Figure 16:
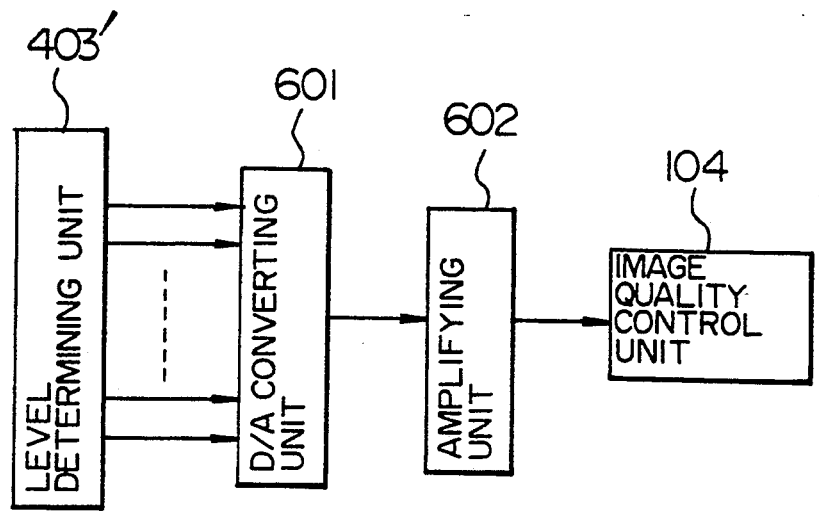
FIG. 16 is a block diagram illustrating an example of an image quality control signal generating unit shown in FIG. 14.

FIG. 16 illustrates a specific example of the image quality control signal generating unit 405' shown in FIG. 14. In FIG. 16, reference numeral 601 designates a D/A convertor, and 602 an amplifier. The outputs of the level determining unit 403 are supplied to the D/A convertor 601 which generates a sequential output signal in response to the outputs of the level determining unit 403'. The amplifier 602 amplifies the magnitude of the output signal of the D/A convertor 601 as necessary and supplies the amplified signal to the image quality control unit 104. It will thus be appreciated that the illustrative image quality control signal generating unit 405' constructed as described above can sequentially control the image quality in accordance with the characteristic of an input signal.

Figure 17:
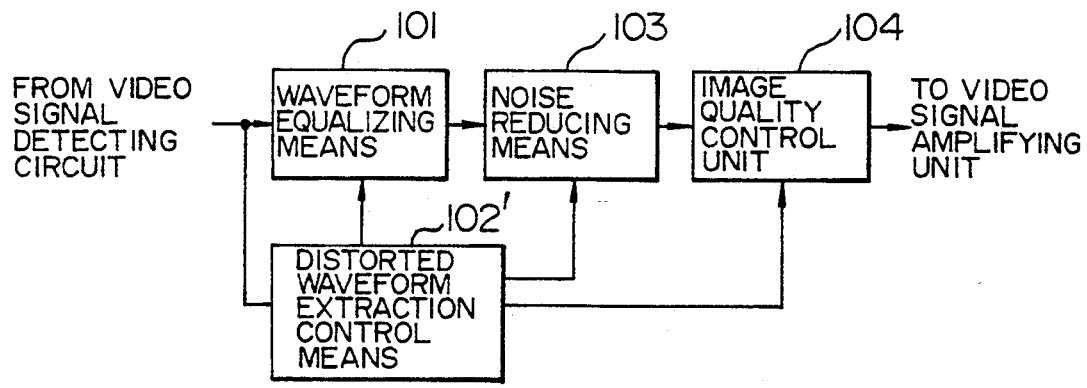
FIG. 17 is a block diagram illustrating a second embodiment according to the present invention.

Next, FIG. 17 illustrates a second embodiment of the present invention. The image control apparatus of the second embodiment comprises a waveform equalizing means 101 coupled to receive a video signal for removing distorted waveform such as ghost from the video signal and outputting the distortion-free video signal, a distorted waveform extraction control means 102' coupled to receive the video signal before waveform equalization for detecting distorted waveform such as ghost and for controlling the waveform equalizing means 101, a noise reducing means 103 and an image quality control means 104. The noise reducing means 103 is coupled to receive the video signal outputted from the waveform equalizing means 101 for reducing noises included therein in accordance with the output of the distorted waveform extraction control means 102' and for outputting the noise-reduced video signal, and the image quality control means 104 is coupled to receive the video signal output from the noise reducing means 103 for controlling the image quality (particularly the sharpness) in accordance with the distorted waveform extraction control means 102' and for outputting the video signal having the image quality thus adjusted.

Specifically, the waveform equalizing means 101 is controlled by the distorted waveform extraction control means 102' to have the characteristic for performing suitable waveform equalization to a given input signal to remove a distorted waveform from the input signal. The noise reducing means 103 and the image quality control means 104 are responsive to the output of the distorted waveform extraction control means 102' to perform noise reduction and control the image quality, respectively.

Figure 18:
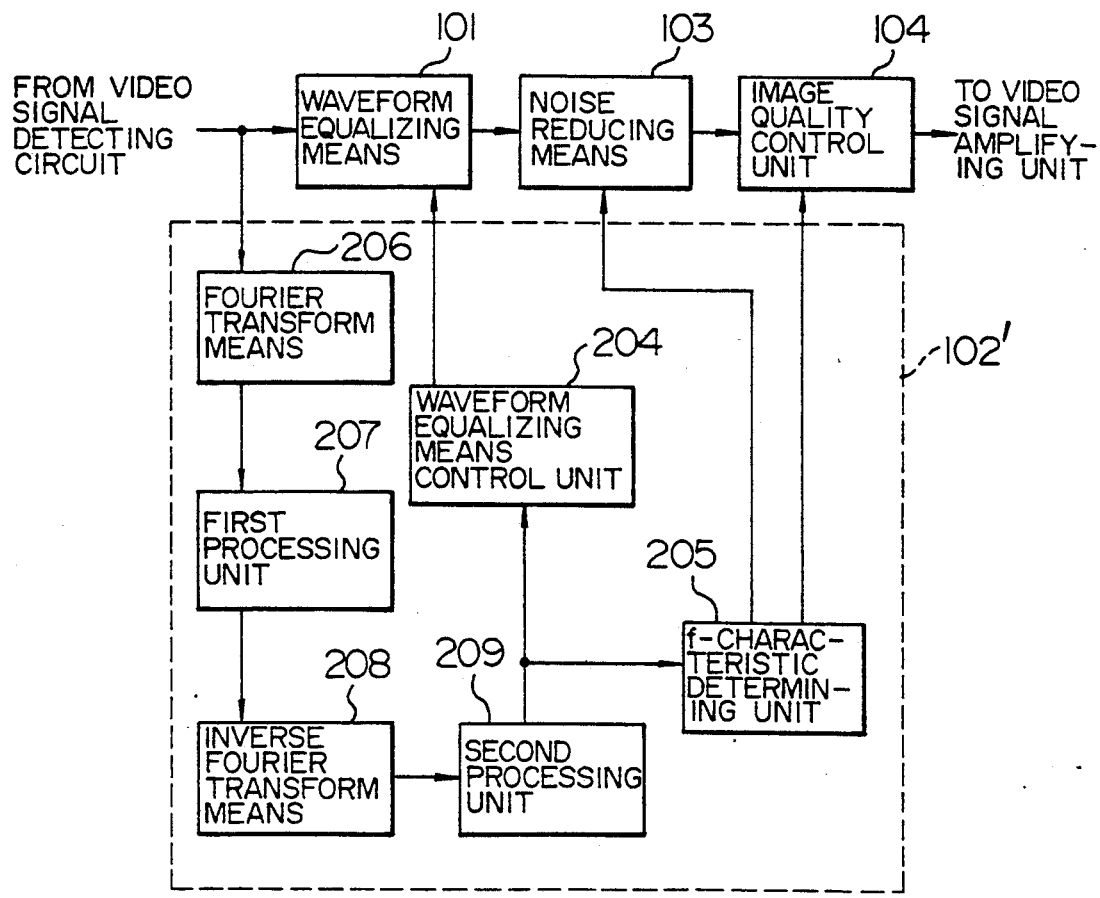
FIG. 18 is a block diagram illustrating in detail a distorted waveform extraction control means shown in FIG. 17.

FIG. 18 illustrates in greater detail the configuration of the distorted waveform extraction control means 102' shown in FIG. 17. In FIG. 18, reference numeral 206 designates a Fourier transform means, 207 a first processing unit, 208 an inverse Fourier transform means, and 209 a second processing unit.

An input video signal is supplied to the waveform equalizing means 101 and the Fourier transform unit 206. The Fourier transform means 206 Fourier transforms the input video signal for performing frequency spectrum analysis. The first processing unit 207 processes the output of the Fourier transform means 206 and a Fourier transformed reference signal such as a GCR signal or a synchronizing signal, previously provided therein, to derive the propagation characteristics of respective frequency bands in the waveform equalizing means 101. Then, the inverse Fourier transform means 208 inversely Fourier transforms the propagation characteristics. Incidentally, the Fourier transform and inverse Fourier transform can be realized by an algorithm such as FFT (Fast Fourier Transform) using a microprocessor (a number of literatures relative to numerical calculation have been published, regarding such algorithms).

The second processing unit 209 calculates a time delay of distorted wave from a base waveform and the magnitude of the distortion from the output of the inverse Fourier transform means 208, and generates a waveform equalization control signal consisting of a tap number and a tap gain for controlling the waveform equalizing means 101. A waveform equalizing means control unit 204 controls the waveform equalizing means 101 based on the output of the second processing unit 209 to perform suitable waveform equalization. An f-characteristic determining unit 205 determines the frequency characteristic of the input video signal from the output of the second processing unit 209, and supplies the noise reducing means 103 with a signal for controlling the degree of noise reduction to be performed as well as the image control means 104 with a signal for controlling the image quality. Incidentally, it goes without saying that the f-characteristic determining unit 205 may be supplied with the output of the waveform equalizing means control unit 204 or control information held in the waveform equalizing means 101. Also, since the frequency characteristic can be detected from the output of the Fourier transform means 206, the output of the Fourier transform means 206 or the output of the first processing unit 207 may be utilized to control either or both of the noise reducing means 103 and the image quality control unit 104.

Figure 19:
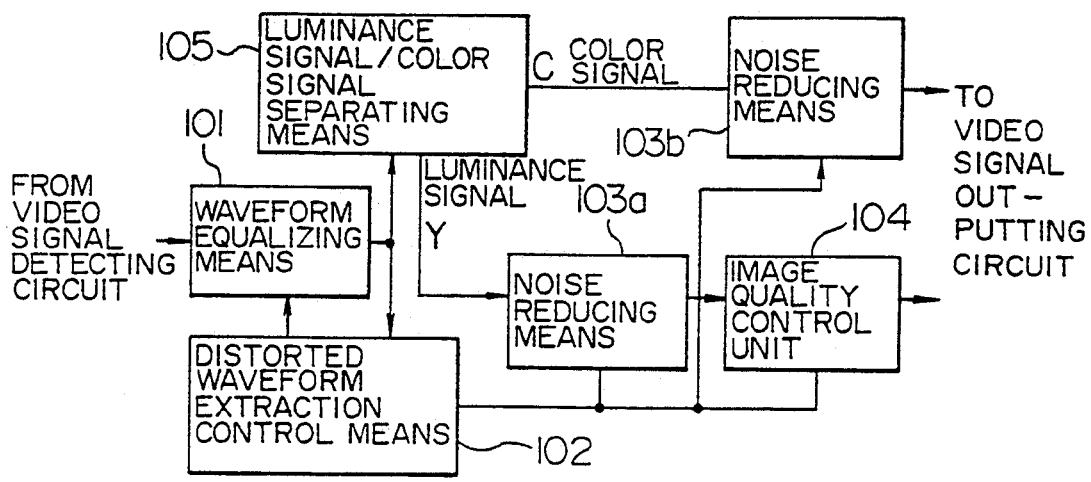
FIG. 19 is a block diagram illustrating a third embodiment of the present invention.

Next, FIG. 19 illustrates a third embodiment of the present invention. In FIG. 19, reference numeral 105 designates a luminance signal and color signal separating means, and 103a, 103b noise reducing means.

In this embodiment, the luminance signal and color signal separating means 105 is arranged between a waveform equalizing means 101 and the noise reducing means 103a and 103b.

The luminance signal and color signal separating means 105 separates the output of the waveform equalizing means 101 into a luminance signal Y and a color signal C and supplies the luminance signal to the noise reducing means 103a, and the color signal C to the noise reducing means 103b.

The noise reducing means 103 is divided into one 103a for luminance signal and the other 103b for color signal, each of which can be constructed appropriately. The image quality control unit 104 is placed at the rear stage of the noise reducing means 103a for luminance signal so as to exclusively control the image quality associated with the luminance signal Y. This is because the image quality can be controlled by emphasizing or attenuating particular frequency components from 0 to 4.2 MHz included in the luminance signal Y, whereas the color signal C has color tone information in the phase of a carrier signal at 3.58 MHz and color intensity information in the amplitude of the same, so that if an image quality control is performed also on the color signal C, color tone and color intensity of a resultant image may turn out to be unnatural. Also, both of the noise reduction and the image quality control may not necessarily be performed. Alternatively, either of them may be sufficient. Also, a configuration may be employed where the noise reduction or the image quality control is performed only on the luminance signal Y, while neither of them are performed on the color signal C. A further alternative configuration may be possible where the noise reduction is performed only on the color signal C, and no control is performed on the luminance signal Y. Incidentally, the noise reduction performed on the color signal may also be effected on a color difference signal or an RGB signal.

Figure 20:
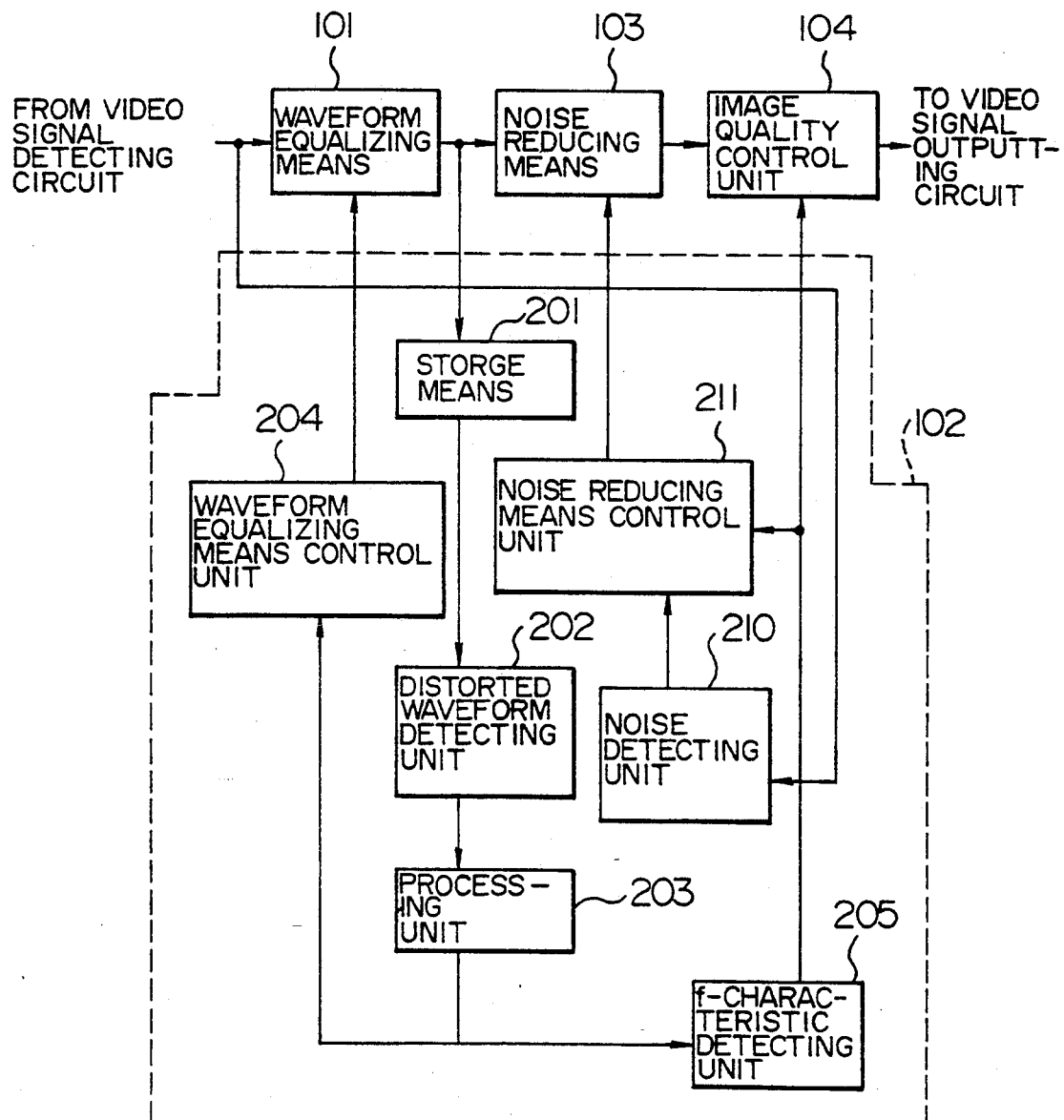
FIG. 20 is a block diagram illustrating a fourth embodiment of the present invention.

Next, FIG. 20 illustrates a fourth embodiment of the present invention. Reference numeral 210 designates a noise detecting unit, and 211 a noise reducing means control unit.

In the fourth embodiment, the noise detecting unit 210 and the noise reducing means control unit 211 are additionally provided for controlling a noise reducing means 103.

The noise detecting unit 210 detects the magnitude of noise components in an input video signal, and outputs a signal for controlling the noise reducing means 103 when the detected magnitude of noise components is above a predetermined value. The noise detection can utilize an AGC signal of the video signal. Specifically explaining, when a signal is weak, a lot of noises are included in the signal, and vice versa. Since the AGC signal depends on the magnitude of noises, a noise level can be determined based on the AGC signal. As another method of noise detection, noises can be detected by calculating the difference between two corresponding images which are precede and after from follow each other.

Figure 21:
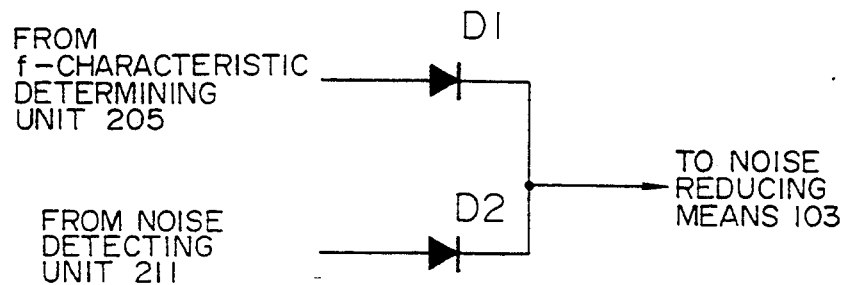
FIG. 21 is a circuit diagram illustrating an embodiment of a noise reducing means control unit shown in FIG. 20.

The noise reducing means control unit 211, when either the f-characteristic determining unit 205 or the noise detecting unit 210 generates a control signal for instructing noise reduction, controls the noise reducing means 103 in response to the control signal. FIG. 21 illustrates a specific example of the noise reduction control unit 211. In FIG. 21, references D1 and D2 designate diodes. It will be understood from FIG. 21 that a signal for controlling the noise reducing means 103 is output when either of an output signal from the f-characteristic determining unit 205 and an output signal from the noise detecting unit 210 is input. The circuit shown in FIG. 21 may be likewise arranged between the D/A convertor 501 and the amplifier 502.

Figure 22:
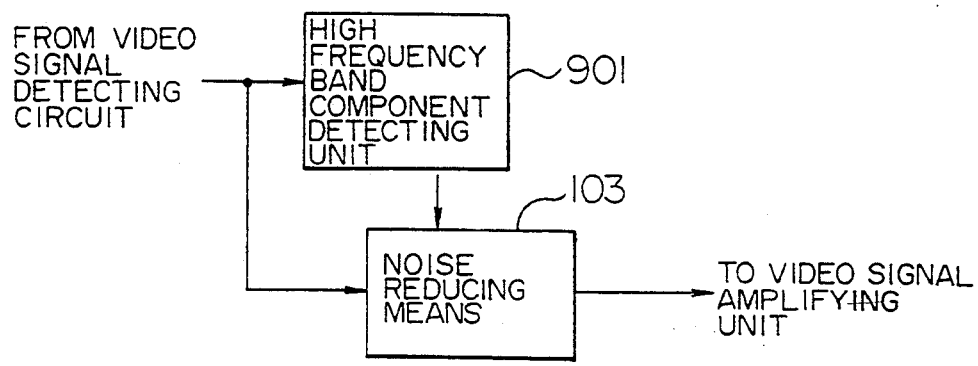
FIG. 22 is a block diagram illustrating a fifth embodiment of the present invention.

FIG. 22 illustrates a further embodiment from another point of view. The image control apparatus of this embodiment comprises a high frequency band component detecting unit 901 coupled to receive an input video signal for detecting high frequency components of the input video signal on the frequency characteristic, where noises are particularly visible, and for supplying a noise reducing means 103 with a control signal in accordance with the detected high frequency components, and the noise reducing means 103 for performing noise reduction in response to the output of the high frequency component detecting unit 901.

More specifically, the high frequency component detecting unit 901 detects the magnitude of high frequency components of an input video signal and generates a control signal for performing noise reduction when the magnitude of detected high frequency components is small and the S/N ratio of the input video signal is low. The noise reducing means 103 performs noise reduction in response to the control signal generated from the high frequency component detecting unit 901.

In these components, the image quality control unit and the noise reducing means may be connected in the reverse order.

Incidentally, the configuration as described above can naturally be implemented by software by using a microcomputer or the like. If the image quality is enhanced, the S/N ratio is more or less degraded, so that the noise reduction may only be controlled without controlling the image quality control unit. It is also possible to implement a configuration such that noises are suppressed by degrading the image quality, where the image quality control means only is controlled without controlling the noise reducing means.

As described above, the present invention can detect changes in the frequency characteristic of an input signal, even if the input signal includes few high frequency components (that is, the level of the high frequency band of the input signal is low) irrespective of the S/N ratio of the input signal, which may cause problems in the prior art, and adjust the degree of noise reduction to be performed and the image quality to provide appropriate images. Also, even if the high frequency band of the frequency characteristic of an input signal is excessively raised (that is, the level of the high frequency band of the input signal is high), changes in the frequency characteristic can be likewise detected, and the image quality can be adjusted in accordance with the detected changes, thereby making it possible to reduce a dim image impression after performing waveform equalization. Further, the frequency characteristic of an input signal is detected from the output of a processing unit for processing the characteristic of a waveform equalizing means, simultaneously with waveform equalization, and the degree of noise reduction and the image quality are controlled to be usually optimal, whereby only a small number of newly additional means are required to the configuration for implementing the foregoing functions.

We claim:

1. An image control apparatus in a television receiver comprising:
    distorted waveform extraction control means coupled to receive a video signal for extracting a distorted waveform in said video signal, for generating a first control signal having a frequency characteristic for removing the distorted waveform, for detecting a signal level of high frequency band components in said video signal based on said first control signal, and for generating a second control signal dependent on the signal level, said distorted waveform extraction control unit including:

a distorted waveform detecting unit for detecting said distorted waveform from one of an input video signal and said video signal from said waveform equalizing means, a first control signal generating unit for generating said first control unit for reducing said distorted waveform detected by said distorted waveform detecting unit, and a frequency characteristic determining unit for extracting high frequency band components of said video signal from said first control signal generating unit to generate said second control signal;

waveform equalizing means coupled to receive said video signal for removing said distorted waveform included in said video signal based on said first control signal generated by said distorted waveform extraction control means; and a video signal control unit coupled to receive a video signal output from said waveform equalizing means for controlling a high frequency band of said input video signal based on said second control signal generated by said distorted waveform extraction control means.

2. An image control apparatus according to claim 1, wherein said video signal control unit comprises noise reducing means for reducing noises included in the high frequency band of said video signal.

3. An image control apparatus according to claim 2, wherein said noise reducing means includes:

a filter for passing a frequency band including a frequency range of noises which are visible on images;

means for controlling the magnitude of an output of said filter generated by passing said video signal through said filter by means of said control signal generated by said high frequency band component detecting means; and subtracting means for subtracting said filter output from said control means from said video signal.

4. An image control apparatus according to claim 3, wherein said filter has the characteristic for passing a frequency range including 2 to 3 MHz.

5. An image control apparatus according to claim 2, wherein said noise reducing means includes:

means for delaying said video signal by a two-frame portion;

means for controlling the magnitude of said delayed video signal by means of said control signal from said high frequency band component detecting means; and adding means for adding the output from said control means to said video signal.

6. An image control apparatus according to claim 2, wherein said video signal control unit further comprises an image quality control unit for controlling the high frequency band characteristic of said video signal through said noise reducing means.

7. An image control apparatus according to claim 1, wherein said video signal control unit is an image quality control unit for controlling the high frequency band characteristic of said video signal by means of said control signal.

8. An image control apparatus according to claim 7, wherein said image quality control unit includes:

a filter for passing a frequency band including a range of frequencies which may affect the image quality;

means for controlling the magnitude of a filter output generated by passing said video signal through said filter by means of said control signal generated by said high frequency band component detecting means; and adding means for adding the output from said control means to said video signal.

9. An image control apparatus according to claim 8, wherein said filter has the characteristic for passing a frequency range including 2-3 MHz.

10. An image control apparatus according to claim 1, wherein said waveform equalizing means comprises a transversal filter for controlling the frequency characteristic of said video signal based on said first control signal generated by said distorted waveform extraction control unit.

11. An image control apparatus according to claim 10, wherein said transversal filter includes:

a plurality of delay units connected in series;

control means coupled to output terminals of the respective delay units for controlling delayed video signals appearing at said respective output terminals by means of said first control signal generated by said distorted waveform extraction control unit; and adding means for adding each video signal from said control means to said input video signal.

12. An image control apparatus according to claim 11, wherein said first control signal generated by said distorted waveform extraction control means includes a plurality of tap signals to be respectively supplied to said control means.

13. An image control apparatus according to claim 12, wherein said distorted waveform extraction control means includes:

a distorted waveform detecting unit for detecting a distorted waveform in either of said input video signal and a video signal from said waveform equalizing means;

a tap signal generating unit for generating said plurality of tap signals to be supplied to each of said control means of said waveform equalizing means in order to reduce said distorted waveform detected by said distorted waveform detecting unit; and a frequency characteristic determining unit for extracting high frequency band components of said video signal from said tap signals generated by said tap signal generating unit to generate said second control signal.

14. An image control apparatus according to claim 13, wherein said distorted waveform detecting unit includes:

a processing unit for processing frequency components giving distorted waveform included in said video signal and the magnitude of said frequency components, based on a signal indicative of the difference between a base signal stored in said processing unit and a reference signal included in one of said input video signal and the video signal from said waveform equalizing means; and a waveform equalizing means control unit for generating said plurality of tap signals based on the frequency components and the magnitude thereof, both processed by said processing unit.

15. An image control apparatus according to claim 14, wherein said frequency characteristic determining unit comprises means for extracting high frequency band components of said video signal based on the frequency components and the magnitude thereof, both processed by said processing unit, to generate said second control signal.

16. An image control apparatus according to claim 14, wherein said frequency characteristic determining unit comprises means for extracting high frequency band components of said video signal from said tap signals generated by said waveform equalizing means to generate said second control signal.

17. An image control apparatus according to claim 13, wherein said frequency characteristic determining unit includes:
means for extracting at least one tap signal corresponding to said high frequency band components generated by said tap signal generating unit; and
means for generating said second control signal based on said tap signal extracted by said extracting means.

18. An image control apparatus according to claim 11, wherein said control means is a multiplying unit.

19. An image control apparatus according to claim 18, wherein said first control signal generated by said distorted waveform extraction control means comprises a plurality of tap signals to be supplied to said multiplying means.

20. An image control apparatus according to claim 19, wherein said distorted waveform extraction control unit includes:
a distorted waveform detecting unit for detecting said distorted waveform from one of said input video signal and the video signal from said waveform equalizing means;
a tap signal generating means for generating said plurality of tap signals to be supplied to each of said multiplying units constituting said waveform equalizing means for reducing the distorted waveform detected by said distorted waveform detecting unit; and
a frequency characteristic determining unit for extracting high frequency band components from said tap signals generated by said tap signal generating unit to generate said second control signal.

21. An image control apparatus according to claim 20, wherein said frequency characteristic determining unit includes:
means for extracting at least one tap signal corresponding to said high frequency band components generated by said tap signal generating unit; and
means for generating said second control signal based on said tap signal extracted by said extracting means.

22. An image control apparatus according to claim 21, wherein said second control signal generating means comprises means for generating said second control signal when a tap signal extracted by said tap signal extracting means is negative.

23. An image control apparatus according to claim 22, wherein said video signal control unit comprises noise reducing means.

24. An image control apparatus according to claim 21, wherein said second control signal generating means comprises means for generating said second control signal when a tap signal extracted by said tap signal extracting means is negative.

25. An image control apparatus according to claim 24, wherein said video signal control unit is an image quality control unit.

26. An image control apparatus according to claim 13, wherein said tap signal generating unit comprises tap signal generating means for generating a plurality of tap numbers determined corresponding to said respective control means constituting said waveform equalizing means and a plurality of tap gains which constitute said first control signals corresponding to said respective tap numbers.

27. An image control apparatus according to claim 26, wherein said frequency characteristic determining unit includes:
means for extracting at least one tap signal corresponding to said high frequency band components generated by said tap signal generating unit; and
means for generating said second control signal based on said tap signal extracted by said extracting means.

28. An image control apparatus according to claim 27, wherein said tap signal generating means includes:
a memory for storing at least one predetermined tap number; and
signal holding means for holding, when a tap number is input which is the same as that stored in said memory, a tap gain corresponding to said tap number, and
wherein said second control signal generating means is means for generating said second control signal based on the tap gain held in said signal holding means.

29. An image control apparatus according to claim 28, wherein:
when a plurality of tap numbers have been stored in said memory, said signal holding means sums up tap gains corresponding to said plurality of tap numbers and holds the sum signal.

30. An image control apparatus according to claim 28, wherein said second control signal generating means includes:
a memory for storing a predetermined base level of high frequency band components; and
a level determining unit for comparing a tap signal extracted by said tap signal extracting means with said base level stored in said memory to generate said second control signal.

31. An image control apparatus according to claim 21, wherein said second control signal generating unit includes:
a memory for storing a predetermined base level of high frequency band components; and
a level determining unit for comparing a tap signal extracted by said tap signal extracting means with said base level stored in said memory to generate said second control signal in proportion to a signal representing the difference between said tap signal and said base level.

32. An image control apparatus according to claim 1, wherein said distorted waveform extraction control means includes:
Fourier transform means for Fourier transforming said input video signal;
a first processing unit for deriving the propagation characteristic in said waveform equalizing means by processing said Fourier transformed video signal;
inverse Fourier transform means for inversely Fourier transforming the derived propagation characteristic;

a second processing unit for generating said first control signal from the inversely Fourier transformed propagation characteristic;

a waveform equalizing means control unit for supplying said first control signal to said waveform equalizing means; and a frequency characteristic determining unit for determining, from said first control signal, changes in the frequency characteristic caused by waveform equalization performed on said video signal to generate said second control signal in accordance with the determined changes.

33. An image control apparatus according to claim 1, further comprising luminance signal/color signal separating means for separating the video signal output from said waveform equalizing means into a luminance signal and a color signal, wherein said image quality control means comprises means coupled to receive at least one of said luminance signal and said color signal separated by said separating means for controlling the high frequency band of said input signal.

34. An image control apparatus according to claim 1, further comprising:

noise detecting means for detecting noises included in said video signal; and selecting means for selecting the larger one from a detecting signal generated by said noise detecting means and said second control signal generated by said distorted waveform extraction control means to generate a noise reducing signal, wherein said video signal control unit is noise reducing means for reducing noises based on said noise reducing signal from said selecting means.

* * * * *